Figure 1:
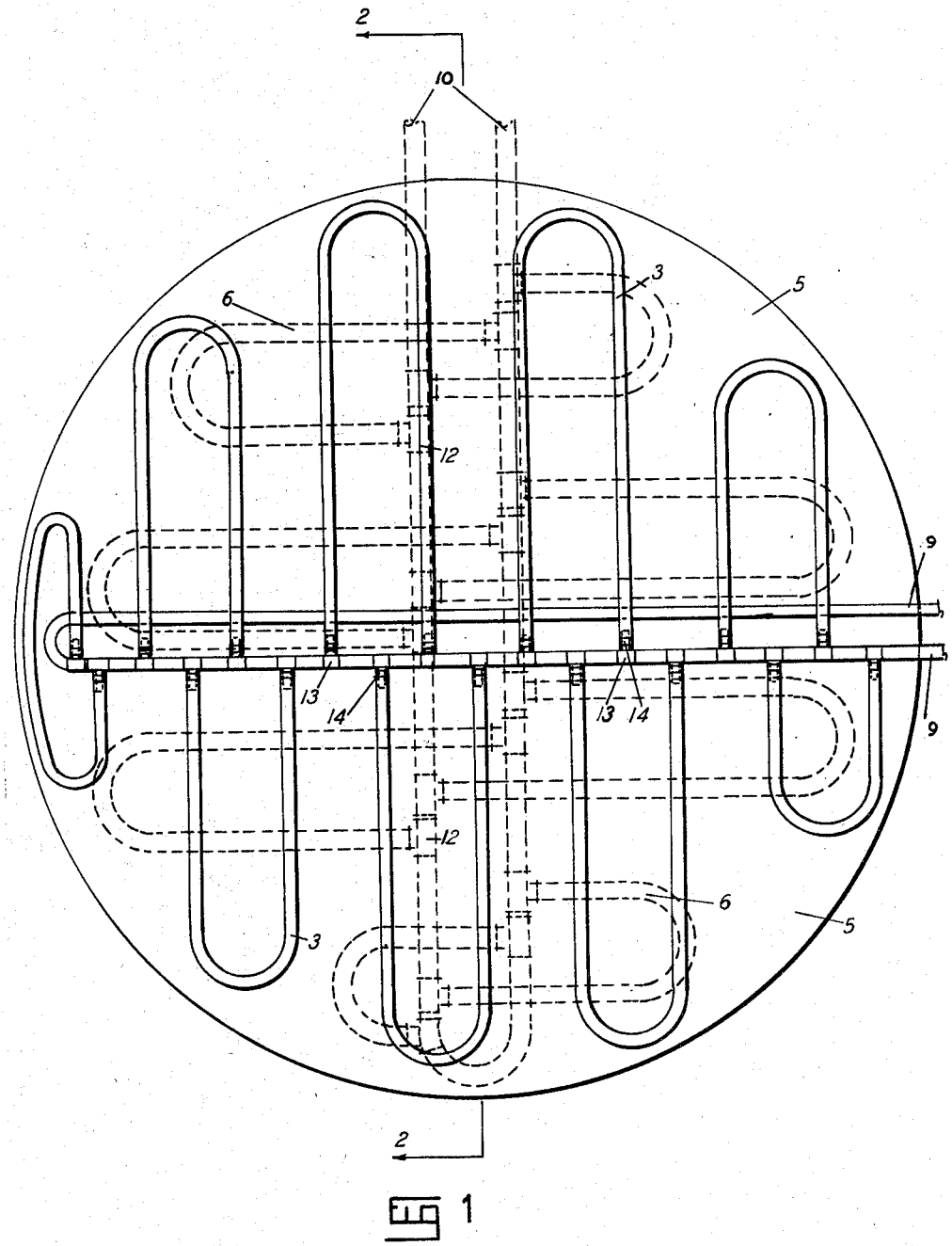

Aug. 2, 1960 M. B. DAVIS, SR., ET AL 2,947,109
MEANS FOR KEEPING GRASS GREEN ON A GOLF PUTTING GREEN
Filed Feb. 19, 1959 2 Sheets-Sheet 1

INVENTORS
Melvin B. Davis, Sr. and
Paul L. Davis
BY Chas. Denegre
Attorney

Aug. 2, 1960  M. B. DAVIS, SR., ET AL  2,947,109
MEANS FOR KEEPING GRASS GREEN ON A GOLF PUTTING GREEN
Filed Feb. 19, 1959  2 Sheets-Sheet 2
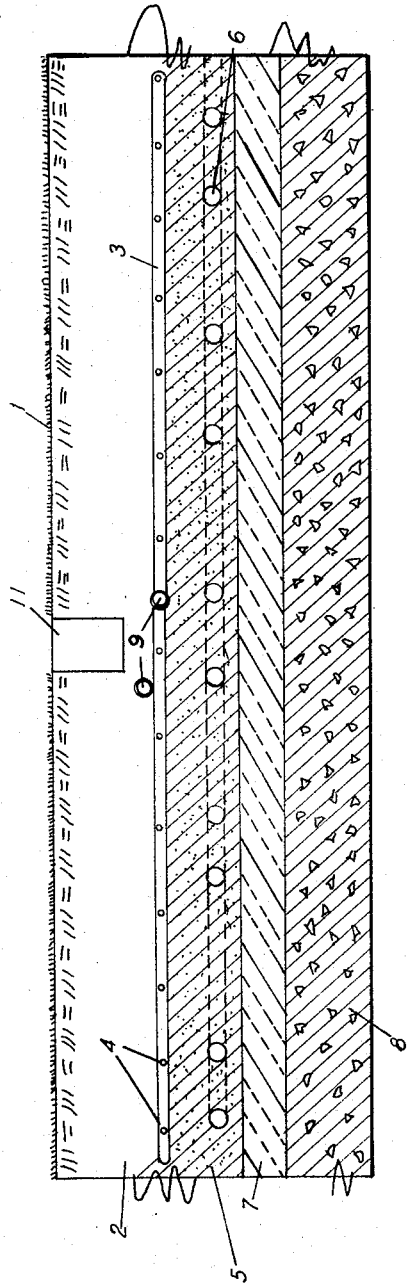
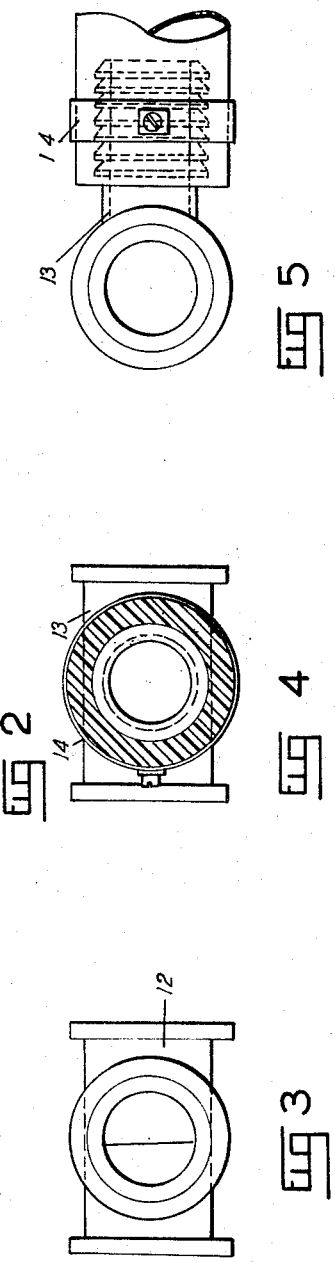

2,947,109

MEANS FOR KEEPING GRASS GREEN ON A GOLF PUTTING GREEN

Melvin B. Davis, Sr., 948 Hillcrest Ave., Birmingham 8, Ala., and Paul L. Davis, 2320 3rd Place NW., Birmingham, Ala.

Filed Feb. 19, 1959, Ser. No. 794,325

2 Claims. (Cl. 47—1)

This invention relates to means for keeping grass green on a golf putting green. It has for its main objects to provide such means that will be highly satisfactory for the purpose intended, simple in structure, comparatively cheap to maintain in good condition, and very durable.

At the present time it is necessary to change and cultivate different kinds of grass on golf putting greens to suit seasons and weather conditions. The present invention will eliminate such trouble by keeping the grass green in all kinds of weather and seasons.

Other objects and advantages will appear from the drawings and specification.

By referring generally to the drawings it will be observed that Fig. 1 is a plan view of a golf putting green made according to this invention; Fig. 2 is a vertical center sectional view on line 2—2 of Fig. 1 showing the means used for the purpose of the invention; Fig. 3 is a side view enlarged of monoflow pipe T used on the hot water pipe; Fig. 4 is an end view, enlarged of T used on the plastic hose; and Fig. 5 is a side view enlarged showing how a plastic hose end is attached on the T.

Similar reference numerals refer to similar parts throughout the several views.

Referring to the drawings in detail it will be seen that the grass 1 is planted in a layer of suitable soil 2 over a coil of plastic hose 3 provided with perforations 4 for water to pass through to wet the layer of sand 5 in which a metal pipe coil 6 is located for hot water to pass through. A layer of sawdust 7 is placed below the sand. A layer of gravel 8 forms the bottom that rests on the earth. A water supply pipe is connected to the plastic coil at 9 to keep the sand slightly wet. A hot water supply pipe is connected to the metal pipe coil at 10 to maintain the desired temperature to keep the grass green in cold weather. The temperature of the hot water is regulated by a suitable thermostat (not shown) of standard design. The green is provided with a regular center hole 11. Connections to the hot water coil make use of T 12, and connections to the plastic hose make use of T 13 and band 14. The pipes leading to the coils in the green would of course be underground and lead from sources of cold and hot water properly regulated so as to maintain the sand in damp condition at a desired temperature to keep the grass green in cold weather. Nature would take care of the grass in warm weather.

The layers of material may be of different thicknesses but we have learned by experiments that good results are obtained by eight inches of good soil for the grass, six inches of sand, two inches of sawdust, and four inches of gravel or the like, the bottom foundation being the earth.

The same means may be used to keep grass green on football fields, lawns, or the like.

The means described may be used in different sizes and capacities depending on how and where to be used.

While we have shown and described the preferred embodiment of our invention, we do not wish to limit same to the exact and precise details of structure, and reserve the right to make all modifications and changes so long as they remain within the scope of the invention and the following claims.

Having described our invention we claim:

1. A golf putting green, means for keeping grass green on said golf putting green comprising, a layer of soil, grass growing on the soil, a coil of plastic tube, said coil having a plurality of perforations therein, said coil being located in the bottom portion of the soil, a layer of sand, said soil resting on said sand, a coil made of metal pipe, this coil being located in said sand, a layer of sawdust, said sand resting on said sawdust, a layer of gravel, said sawdust resting on said gravel, said gravel resting on the surface of the earth; all of said layers being of the same area and extending to the edge of the putting green; a regulated source of cold water connected to said plastic coil; a regulated source of hot water connected to said metal pipe coil.

2. A golf putting green, means for keeping grass green on said golf putting green comprising, a layer of soil eight inches thick, grass growing on the soil, a coil of plastic tube, said coil having a plurality of perforations therein, said coil being located in the bottom portion of the soil, a layer of sand six inches thick, said soil resting on said sand, a coil made of metal pipe, this coil being located in said sand, a layer of sawdust two inches thick, said sand resting on said sawdust, a layer of gravel four inches thick, said sawdust resting on said gravel, said gravel resting on the surface of the earth; all of said layers being of the same area and extending to the edge of the putting green; a regulated source of cold water connected to said plastic coil; a regulated source of hot water connected to said metal pipe coil.

References Cited in the file of this patent

UNITED STATES PATENTS

| | | |
|---|---|---|
| 1,171,558 | Taylor | Feb. 15, 1916 |
| 1,638,862 | Lott | Aug. 16, 1927 |
| 1,763,411 | Swope | June 10, 1930 |
| 2,075,590 | North | Mar. 30, 1937 |

FOREIGN PATENTS

| | | |
|---|---|---|
| 721,287 | France | Dec. 12, 1931 |
| 142,953 | Great Britain | May 20, 1920 |